United States Patent [19]

Eckart et al.

[11] Patent Number: 5,894,048
[45] Date of Patent: Apr. 13, 1999

[54] SYNTHETIC LAMINATE STRUCTURE AND METHOD FOR MAKING SAME

[75] Inventors: Michael Dennis Eckart, Blountville, Tenn.; Raymond Lynn Goodson, Sandy, Utah

[73] Assignee: Eastman Chemical Company, Kingsport, Tenn.

[21] Appl. No.: 08/741,961

[22] Filed: Oct. 31, 1996

Related U.S. Application Data

[63] Continuation-in-part of application No. 08/575,454, Dec. 20, 1995, Pat. No. 5,643,666.

[51] Int. Cl.$^6$ .................. B32B 27/08; C09D 5/29
[52] U.S. Cl. .................. 428/339; 528/272; 528/302; 528/307; 528/308; 528/308.6; 428/221; 428/332; 428/339; 428/354; 428/480; 428/481; 428/483; 523/171; 264/4; 264/239; 264/241; 264/330
[58] Field of Search ............... 528/272, 302, 528/307, 308, 308.6; 428/221, 332, 339, 354, 480, 481, 483; 523/171; 264/4, 239, 241, 330

[56] References Cited

U.S. PATENT DOCUMENTS

| | | | |
|---|---|---|---|
| 3,396,067 | 8/1968 | Schafer | 161/5 |
| 4,289,818 | 9/1981 | Casamayor | 428/43 |
| 4,433,070 | 2/1984 | Ross et al. | 523/171 |
| 4,544,584 | 10/1985 | Ross et al. | 428/15 |
| 5,091,258 | 2/1992 | Moran | 428/437 |
| 5,286,290 | 2/1994 | Risley | 106/401 |
| 5,413,840 | 5/1995 | Mizuno | |
| 5,443,912 | 8/1995 | Olson | 428/425.6 |
| 5,445,871 | 8/1995 | Murase | 428/215 |
| 5,492,589 | 2/1996 | Mizuno | |

FOREIGN PATENT DOCUMENTS 0 587 353 A1  3/1994  European Pat. Off. .

*Primary Examiner*—Samuel A. Acquah
*Attorney, Agent, or Firm*—Cheryl J. Tubach; Harry J. Gwinnell

[57] ABSTRACT

This invention relates to a synthetic laminate structure and a method for making the synthetic laminate structure. More particularly, the synthetic laminate structure contains an outer layer comprising a substantially transparent copolyester, a printed or colored film layer having opposed surfaces wherein at least one of the surfaces is colored or has an image printed thereon, a backing layer, and a laminating enhancer layer comprising a polyurethane disposed between the outer layer and the film layer, the laminated enhancer layer providing a bond between the outer layer and film layer characterized by a substantial absence of visible air pockets or adhesion discontinuities.

21 Claims, 1 Drawing Sheet

SYNTHETIC LAMINATE STRUCTURE AND METHOD FOR MAKING SAME

CROSS REFERENCE TO RELATED APPLICATIONS

This application is a continuation-in-part of application Ser. No. 08/575,454, filed Dec. 20, 1995 now U.S. Pat. No. 5,643,666.

FIELD OF THE INVENTION

The present invention relates to a synthetic laminate structure having an aesthetically desirable surface appearance and to a method for making the synthetic laminate structure.

BACKGROUND OF THE INVENTION

Traditional synthetic laminates are composites made from any one of several types of thermosetting plastic and may contain a printed pattern. However, such laminates cannot be thermoformed and are generally rigid and brittle. In addition, certain materials which offer the prospect of providing improved properties in synthetic laminate structures do not readily adhere to adjacent layers resulting in nonuniform lamination or delamination after a period of use or upon being worked as in a milling, cutting or thermoforming operation, which adversely affects the functional or aesthetic characteristics of the resulting product.

SUMMARY OF THE INVENTION

Accordingly, it is an object of this invention to provide a synthetic laminate structure having an aesthetically desirable surface appearance.

It is another object of this invention to provide a synthetic laminate structure of the character described which is lightweight and exhibits good durability.

It is a further object of this invention to provide a synthetic laminate structure of the character described which has the appearance of a natural building material.

It is also an object of this invention to provide a synthetic laminate structure having a colored or printed image wherein the laminated structure can be thermoformed and molded without substantially distorting the colored or printed image and without significant delamination.

An additional object of this invention is to provide a synthetic laminate structure and a method of making synthetic laminate structures wherein layers of material heretofore difficult to laminate are effectively and uniformly laminated together to minimize delamination providing a product with improved functional and aesthetic properties.

Another object of the invention is to provide a synthetic laminate structure which may be thermoformed without significant delamination to provide various shaped articles for lavatory, bath and countertop applications.

With regard to the foregoing, the present invention provides a synthetic laminate structure which comprises:

(A) an outer layer comprising a substantially transparent copolyester having an inherent viscosity of from about 0.5 to about 1.2 dL/g;

(B) a printed or colored film layer having opposed surfaces wherein at least one of the surfaces is colored or has an image printed thereon;

(C) a backing layer disposed adjacent the film layer comprising a polymer selected from the group consisting of polyvinyl chloride and a copolyester; and (D) a laminating enhancer layer comprising a polyurethane disposed between the outer layer and the film layer providing a bond between the layers which is characterized by a substantial absence of visible air pockets or adhesion discontinuities.

In a preferred embodiment, the synthetic laminate structure further comprises a hardcoat selected from the group consisting of UV-cured or electron-beam-cured crosslinked acrylic, vacuum-cured or UV-cured urethane, UV-cured or electron-beam-cured silicon with acrylic, and heat cured urethane or plastisol disposed on the outer layer to provide scratch and dent resistance to the synthetic laminate structure.

The present invention is also directed to a method for making a synthetic laminate structure which comprises:

I. disposing a laminating enhancer comprising a polyurethane in a random or uniform pattern between a first surface of an outer layer comprising a substantially transparent copolyester having an inherent viscosity of from about 0.5 to about 1.2 dL/g and a first surface of a printed or colored film layer so that a substantially discontinuous layer of the laminating enhancer is sandwiched between the first surface of the outer layer and the first surface of the film layer;

II. disposing a backing layer comprising a polymer selected from the group consisting of a copolyester and polyvinyl chloride adjacent a second surface of the film layer so that the outer layer and film layer with the laminating enhancer sandwiched therebetween and the backing layer are in superposed relation; and III. applying sufficient heat and pressure to the superposed outer layer, film layer and backing layer to cause the laminating enhancer to flow and spread between the outer layer and film layer into a substantially continuous layer providing a bond between the outer layer and film layer characterized by a substantial absence of visible air pockets or adhesion discontinuities.

The invention provides a synthetic laminate structure which has an aesthetically desirable surface appearance and exhibits good durability for use as a building material. The laminate has a colored or printed image and can be thermoformed and molded without substantially distorting the colored or printed image and without significant delamination. Light reflecting off the surface of the laminate gives a 3-dimensional appearance or depth effect with respect to the colored or printed film layer.

BRIEF DESCRIPTION OF THE DRAWINGS

The above and other features of the invention will be further described in the following detailed specification considered in conjunction with the accompanying drawings in which.

DESCRIPTION OF THE INVENTION

Figure 1:
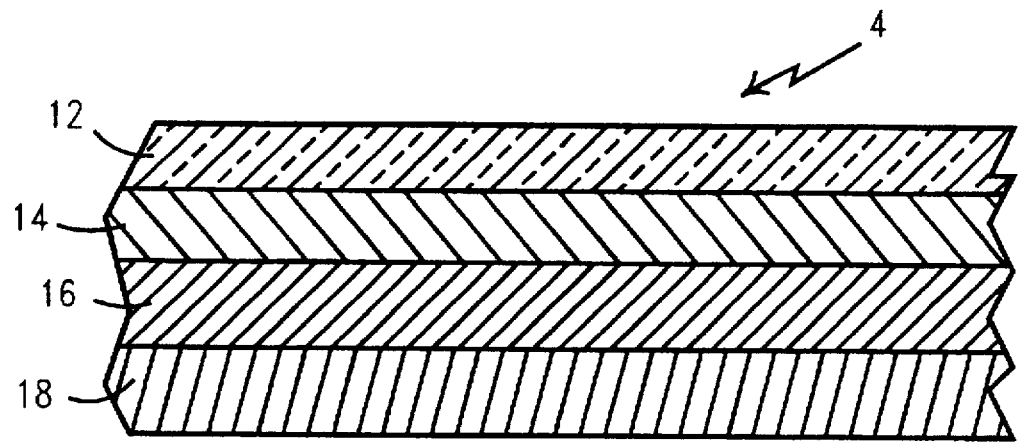
FIG. 1 is a partially separated cross-sectional view of a substantially planar synthetic laminate structure according to one embodiment of the present invention.

This invention relates to a synthetic laminate structure and a method for making the synthetic laminate structure. The laminate has an aesthetically desirable surface appearance, for example, that of a natural building material such as wood or stone. More particularly, the synthetic laminate structure contains an outer layer of transparent copolyester, a printed or colored film layer having opposed surfaces wherein at least one of the surfaces is colored or has an image printed thereon, and a backing layer. A polyurethane-based laminating enhancer is provided between the outer layer and film layer and preferably between the film layer and backing layer. As used herein, "outer layer" and "backing layer" denote positions of the layers relative to the film layer and do not necessarily imply that the outer layer and backing layer are the outermost layers of the laminate structure. Thus, the laminate structure of the present invention may contain multiple layers on each side of the film layer as well as multiple film layers.

The outer layer comprises a transparent copolyester. The copolyester is preferably a PETG copolyester. As defined herein "PETG copolyester" is a polyethylene terephthalate polyester modified with 2 mole % to 99 mole % of cyclohexanedimethanol repeat unit. The cyclohexanedimethanol may be either the 1,4- or 1,3-isomer and may be either in the cis- or trans- form or a mixture of the isomers. The copolyester may be semi-crystalline or amorphous, preferably amorphous. The outer layer is preferably from about 0.13 mm to about 12.7 mm thick (0.005 to about 0.500 inch thick).

The copolyester contains repeat units from a dicarboxylic acid and a diol, based on 100 mole % dicarboxylic acid and 100 mole % diol. The dicarboxylic acid component contains at least 80 mole % of terephthalic acid or dimethylterephthalate. The copolyester may optionally be modified with up to 20 mole % of one or more different dicarboxylic acids other than terephthalic acid or dimethylterephthalate such that the total dicarboxylic acid content is equal to 100 mole %. Examples of other dicarboxylic acids which may be used with terephthalic acid include phthalic acid, isophthalic acid, 1,4-, 1,5-, 2,6-, and 2,7-naphthalenedicarboxylic acid, 1,3-, 1,4-cyclohexanedicarboxylic acid, cyclohexanediacetic acid, oxydibenzoic acid, 4,4-biphenyldicarboxylic acid, succinic acid, glutaric acid, adipic acid, azelaic acid, sebacic acid, suberic acid, pimelic acid, and 1,12-dodecanedioic acid. The copolyester may be prepared from one or more of the above dicarboxylic acids.

It should be understood that use of the corresponding acid anhydrides, esters, and acid chlorides of these acids is included in the term "dicarboxylic acid".

The diol component contains repeat units from 98 to 1 mole % ethylene glycol and 2 to 99 mole % 1,4-cyclohexanedimethanol and/or 1,3-cyclohexanedimethanol. The cyclohexanedimethanol may be present as the cis or trans isomer or mixtures thereof. In addition, the diol component can optionally be modified with up to 20 mole % of one or more different diols other than ethylene glycol and cyclohexanedimethanol such that the total diol content is equal to 100 mole %. The additional diols include cycloaliphatic diols having 6 to 16 carbon atoms and aliphatic diols having 3 to 16 carbon atoms. Examples of diols which may be used with ethylene glycol and cyclohexanedimethanol include diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The copolyester may be prepared from one or more of the above diols. The copolyesters may also be modified with polyethylene glycols or polytetramethylene glycols to enhance elastomeric behavior.

The copolyester has an inherent viscosity of 0.5 to 1.2 dL/g. Preferably, the copolyester has an inherent viscosity of 0.6 to 0.9 dL/g as measured at 25° C. using 0.50 grams of polymer per 100 ml of a solvent consisting of 60% by weight phenol and 40% by weight tetrachloroethane. It is especially preferred that the copolyester be prepared from or derived from repeating units consisting of terephthalic acid units, ethylene glycol units and 1,4-cyclohexanedimethanol units.

The copolyester may be prepared by conventional polycondensation procedures well-known in the art. Such processes include direct condensation of the dicarboxylic acid (s) with the diols or by ester interchange using a dialkyl dicarboxylate. For example, a dialkyl terephthalate such as dimethyl terephthalate is ester interchanged with the diols at elevated temperatures in the presence of a catalyst.

The printed or colored film layer has opposed surfaces wherein an image is printed on one of the surfaces and/or the film layer contains coloration. More than one printed or colored film layer may be used in the laminate structure of the present invention. The use of multiple film layers can provide a 3-dimensional or "floating" appearance to the images or lettering in the printed or colored film layers. Each of the printed or colored film layers is joined to an outer layer on one of its surfaces by means of a laminating enhancer such that the image or coloration can be seen through the outer layer without significant distortion. The printed or colored film layer may comprise any suitable polymeric material which is compatible with the materials used for the outer layer and the backing layer, inks, and other materials used in fabricating the synthetic laminate structure. Preferably, the film layer comprises a polyvinyl chloride (PVC) or copolyester.

The film layer preferably ranges from about 0.025 mm (0.001 inch) to about 0.254 mm (0.010 inch) in thickness, and more preferably 0.025 mm (0.001 inch) to 0.178 mm (0.007 inch) and most preferably about 0.025 mm (0.001 inch) to 0.125 mm (0.0015 inch) in thickness. However, polymeric films thinner or thicker may be used in the film layer depending on the equipment available, and under such conditions the thickness is limited only by functionality.

In one embodiment, the image or coloration is printed on the bottom side of the film layer in which case the polymer used to prepare the film layer should be transparent. Any image may be used provided it has an aesthetically desirable surface appearance such as an image of a natural building material. As used herein the term "building material" means a material of suitable strength, durability, impact resistance, and rigidity that it can be used in construction of articles that could also be constructed of natural building materials such as wood or stone.

The image to be printed on the film layer can be prepared according to conventional photographic printing processes or with a digitized database generated from a photographic image. Digitizing and storing the image may be accomplished through any of a number of processes well known in the computer art as scanning.

Printing a selected image on the film layer may be accomplished by engraving one or more cylinders, and using such cylinders to print the selected engraved image on the film layer with appropriate ink, according to processes well known in the printing art. The resolution of the printing method should be in the range of about 30–59 dots per linear cm (75–150 dots per linear inch), i.e. about 872 $cm^2$–3,488 cm² (5,625–22,500 dots per square inch). An illustrative example of how this printing process can be used for bottom printing a wood grain image on the bottom surface of the film layer comprises using a first cylinder for first printing a pattern of black or other dark colored ink corresponding to the most prominent and most widely spaced grain lines, i.e. coarse grain. A second cylinder may then be used for printing smaller, more closely spaced grain lines, i.e. fine grain, using black or other dark colored ink.

A third cylinder may be used for printing colored bands on the film. For example, bands about 3.8 cm (1.5 inch) wide and spaced apart by about 3.8 cm (1.5 inch) are printed in a selected brown color. These bands give the effect of color variations within the wood, and the widths, spacing, and color of such bands are all selectable. A fourth cylinder may be used for printing a relatively solid background color of a selected shade of brown or other color corresponding to the color of the type of wood being simulated. Also, additional cylinders may be used to provide even more image effects in the printed or colored film layer. It is considered that a person of ordinary skill in the art could select more or fewer cylinders and printing steps to prepare a selected image.

These steps would be re-versed for top printing an image on the top surface of the printed or colored film layer, i.e. the solid color would be printed first followed in succession by printing of the bands, fine grain, and coarse grain. Typically, there is some stretching of the film during printing. Therefore, the second cylinder should be slightly larger than the first cylinder, the third slightly larger than the second, and the fourth slightly larger than the third, so that the image printed with each cylinder is in proper register.

The ink used in the printing is preferably a solvent-based ink which is critical to producing a durable synthetic laminate structure that is resistant to delamination. During bonding together of the layers of the synthetic laminate structure, the layers of ink should bond with any adjacent layers as well as to the polymer used to prepare the printed or colored film layer and backing layer (for bottom printing) or outer layer (for top printing). A particularly preferred solvent-based ink comprises about 20–70% of a solvent, about 5–50% of a pigment, a vinyl acetate polymer and formulation aids, and is available from American Mirrex.

The film layer may also be colored throughout its thickness by inclusion of pigments or colorants therein during its manufacture and this colored film may be used as is without printing thereon, or the colored film may be used as background for further printing of images thereon which may be seen through the outer layer.

The backing layer of polymer may be either transparent or opaque. Hence, the backing layer may be comprised of mixtures or recycled resins which do not necessarily retain transparency or even contain materials to further enhance or modify the properties of the finished synthetic laminate structure. However, the outer layer and the backing layer are preferably thermally compatible. As used herein, "thermal compatible" means that when layers of the synthetic laminate structure are bonded together under conditions of elevated temperature and pressure, the layers undergo approximately equal thermal expansion or contraction such that the surface of the synthetic laminate structure is substantially planar and to minimize interfacial stresses when the product is thermoformed.

The backing layer should exhibit good impact resistance, strength, and compatibility with the printed or colored film layer. The backing layer is preferably from about 0.127 mm to about 24.1 mm thick (0.005 to about 0.950 inch thick).

The thickness of the backing layer is limited only by functionality. Preferably, the backing layer is prepared from a PETG copolyester. The PETG copolyester used to prepare the backing layer may be recycled PETG copolyester, and good optical qualities of the backing layer may not be important in many applications.

The laminating enhancer is selected to have rheological properties enabling the laminating enhancer to be applied in the form of strings or a spray or by means of a gravure printing roller, forming an initially highly viscous liquid, discontinuous layer which dries in the texture of a roughened surface having the feel of sandpaper. The laminating enhancer is spreadable under the application of heat and pressure into coalescence as a continuous film or layer forcing the air out laterally from between the adjacent layers. The laminating enhancer initially separates the outer layer from an adjacent layer in a discontinuous manner with a deliberate pattern of spaces between the layers until sufficient heat and pressure is applied to cause the material to flow and spread into a substantially uniform and continuous layer mechanically and gradually squeezing air from between the outer layer and the adjacent layer, thus minimizing or eliminating formation of air pockets or interface discontinuities. Upon cooling, the laminating enhancer forms an adhesive.

The laminating enhancer in many applications eliminates the need to apply a vacuum in order to remove trapped air between the adjacent layers of the synthetic laminate structure. However, it is noted that for large synthetic laminate structures, for example 3×3 meters, a vacuum may be necessary to assist in removing trapped air between the adjacent layers. Trapped air is undesirable because it distorts the appearance of the synthetic laminate structure and interferes with formation of a continuous cohesive bond between the layers. During lamination the laminating enhancer has been shown to form an interpenetrating network with adjacent layers.

Preferably, the laminating enhancer is a clear waterborne polyurethane which is liquid at 23° C. and is commercially available from Hauthaway under the trademark HD 2001. Combinations of laminating enhancers may also be used in the same synthetic laminate structure. The laminating enhancer may be applied between any layers of the synthetic laminate structure.

It is a feature of the invention that the laminating enhancer is applied initially in a random or uniform pattern so that the laminating enhancer disposed between the layers is substantially discontinuous along the width or X direction and along the length or Y direction, preferably in both the X and Y directions, providing relatively small spaces of discontinuity in the laminating enhancer layer. Processes for applying the laminating enhancer in this manner include spraying the laminating enhancer in a liquid form such as sputtering or dripping the laminating enhancer in drops or strings from a crosswise disposed drip tube with a plurality of small spaced-apart openings. The laminating enhancer is preferably permitted to dry before the film layer is placed on the outer layer with the laminating enhancer sandwiched therebetween supporting the film layer away from the outer layer with small air-filled spaces supplied by the discontinuities in the laminating enhancer layer.

Because the outer layer is generally more substantial and rigid as compared to the film layer, it is preferred to apply the laminating enhancer to the outer layer and after the laminating enhancer cools apply the film layer thereto. However, it is within the scope of the invention to apply the laminating enhancer to the film layer.

The laminating enhancer preferably is applied to the backing layer in the same manner as described above for application to the outer layer provided, however, that in some instances it may be sufficient to apply the laminating enhancer to the backing layer for initial disposition between the backing layer and the film layer as a continuous layer such as where non-uniform adhesion between these layers does not detract from the visual or functional characteristics of the synthetic laminate structure. In some situations the laminating enhancer may be omitted entirely from between the film layer and the backing layer where, depending on the nature of the materials comprising the film layer and the backing layer, a sufficient bond may be achieved with heat and pressure alone.

The synthetic laminate structure preferably further comprises a transparent hard, scratch-resistant or abrasion resistant coating or layer laminated to the top surface of the outer layer. These coatings or layers also increase the chemical resistance of the laminate structure and provide an anti-graffiti surface. For example, PETG copolyester is not as hard or scratch resistant as may be desirable for certain applications. Thus, for an application where the exterior surface might be subjected to being scratched, it may be advantageous to provide a hard coat over the exterior surface. The hard coat may be a bilayer film comprising a hardcoat on top of a film layer. The hard coat is preferably selected from UV-cured or electron-beam-cured crosslinked acrylic, vacuum-cured or UV-cured urethane, UV-cured or electron-beam-cured silicon with acrylic or heat cured urethane or plastisol. A layer of polyurethane may be applied over the exterior surface to provide abrasion resistance. Alternatively, a biaxially oriented polyethylene terephthalate such as MYLAR available from DuPont Chemical Company or teflon such as TEDLAR available from DuPont Chemical Company may be laminated to the top surface of the outer layer as a hard coat.

A method for preparing the synthetic laminate structure of the present invention preferably involves at least two steps. The first step involves applying the laminating enhancer as described above in a random or uniform pattern between a first surface of the outer layer and a first surface of the printed or colored film layer so that a substantially discontinuous layer of the laminating enhancer is sandwiched at least between the first surface of the outer layer and the first surface of the film layer.

The second step involves applying heat and pressure to the outer layer, film layer and backing layer to cause the laminating enhancer layer to flow and spread between the outer layer and film layer into a substantially continuous layer providing an effective bond between the outer layer and film layer characterized by a substantial absence of visible air pockets or adhesion discontinuities.

Optionally, a second laminating enhancer layer is disposed between a first surface of the backing layer and a second surface of the printed or colored film layer prior to heating and pressing so that a layer of the laminating enhancer is sandwiched between the backing layer and the film layer.

Lamination is conducted at a temperature and pressure sufficient to cause the layers of the synthetic laminate structure to become tacky and bond to each other without causing decomposition, distortion, or other undesirable effects.

In the laminating method, a metal plate which is preferably a steel or aluminum plate, a pressure pad to help equalize pressure which is preferably a compressible fabric pad, and a further metal plate which is preferably a flexible aluminum plate having a thickness of 20 mills to 140 mills are respectively aligned in parallel pressing relation upon the exterior surface of the outer layer or hard coat if present. The fabric pad is preferably prepared from copper, silicone, NOMEX which is an aramid fiber or fabric available from DuPont de Nemours, E. I. & Company, or a combination of copper and/or silicone and/or NOMEX.

More preferably, cast paper or embossing paper is disposed between the metal plate and exterior surface of the outer layer or hard coat to provide a texture to the laminate structure and/or to prevent the outer layer which is comprised of PETG copolyester or hardcoat from sticking to the metal plate. Examples of cast paper or embossing paper include patent which provides high gloss, patina which provides a satin finish, matte, stucco, ostrich, reptilian, glitter, topaz, grid, and allegro which provides a leather appearance. A particularly preferred cast paper is available as ULTRACAST from S. D. Warren. In some instances, a hard coat is not necessary because a heavily textured surface may not display scratch marks.

In one embodiment, sufficient heat and pressure may be provided to effect a bond between the layers of the laminate structure in the absence of a press, employing instead the weight of the superposed layers in conjunction with application of heat. To augment the reduction in pressure a vacuum may be applied in order to remove trapped air between the adjacent layers of the synthetic laminate structure.

The laminating method comprises hot press bonding and cold press bonding. Hot press bonding is conducted at a temperature of about 250° F. to about 340° F., preferably 270° F. to 295° F., a pressure of 70 psi to 110 psi, preferably 90 psi to 100 psi, and for a period of time of about 1 to about 15 minutes, preferably 2 to 13 minutes. A temperature exceeding 340° F. and a pressure exceeding 110 psi is undesirable in hot press bonding since the layers may squeeze out of the aligned synthetic laminate structure. Hot press bonding is followed by cold press bonding wherein the synthetic laminate structure is held rigid at a temperature of about 70° F. to about 340° F., preferably 100° F. to 130° F. and a pressure of about 13 psi to about 500 psi, preferably 100 psi to 300 psi, more preferably about 250 psi while the laminate structure cools.

Lamination may be conducted using individual relatively short sheets of overlaid material or using elongated sheets for later width wise separation. The material is preferably laminated in a stationary press, however, the material may be laminated using continuous casting equipment of the type used in the plastics industry for producing laminate web material such as a machine employing upper and lower continuous belts. At least one of the belts is generally heated and the laminate structure is fed into the space between the belts for movement with the belts while being heated and pressed.

Once the synthetic laminate structure is cooled it may be shaped and formed into a variety of useful articles by thermoforming. Illustrative articles include counter tops, table tops, cabinet doors, game boards, juvenile products, toys, panels for shower stalls, hot tubs, chalkboards, indoor and outdoor signs, seamless vanity tops including sink, soap dish, and back splash.

Referring to the drawings, FIG. 1 illustrates a partially separated cross-section of a substantially planar synthetic laminate structure 4. It is noted that the drawings are graphical in nature and not drawn to scale. The synthetic laminate structure 4 comprises four layers: a transparent outer layer 12, a printed or colored film layer 16, a laminating enhancer layer 14 sandwiched between the outer layer 12 and film layer 16, and a backing layer 18. The outer layer 12 and backing layer 18 provide the strength, chemical resistance, impact resistance, scratch resistance and other qualities necessary for the synthetic laminate structure to be used as a synthetic building material, while the film layer 16 is printed with an image or colored.

Figure 2:
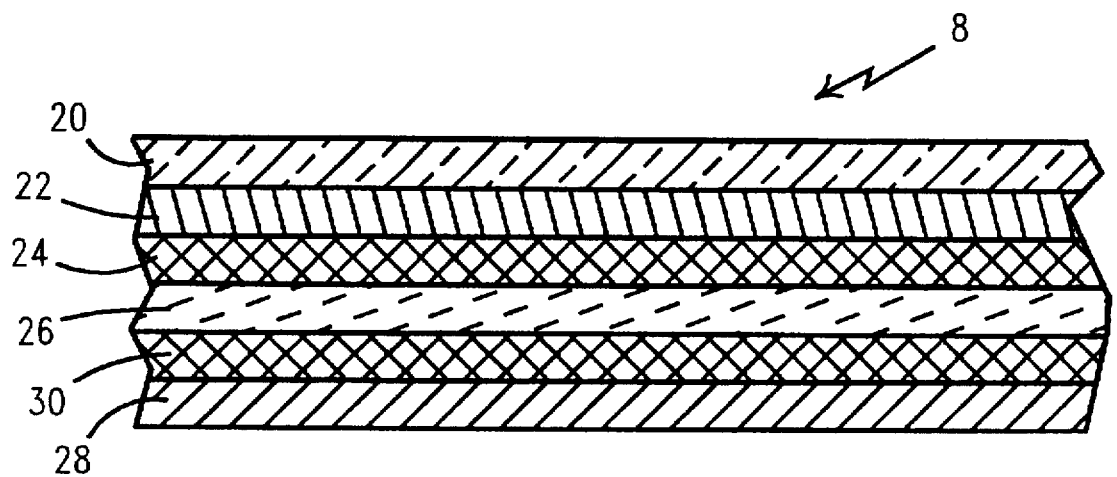
FIG. 2 is a partially separated cross-sectional view of a substantially planar synthetic laminate structure having a hard coat according to another embodiment of the present invention.

Referring to the drawings, FIG. 2 illustrates a partially separated cross-section of a substantially planar synthetic laminate structure 8. The synthetic laminate structure 8 comprises six layers: a hardcoat layer 20, a transparent outer layer 22, a printed or colored film layer 26, a laminating enhancer layer 24 sandwiched between the outer layer 22 and film layer 26, a back layer 28, and a laminating enhancer layer 30 sandwiched between the back layer 28 and film layer 26. The hardcoat layer 20 and backing layer 28 provide the strength, chemical resistance, impact resistance, scratch resistance and other qualities necessary for the synthetic laminate structure to be used as a synthetic building material, while the film layer 26 is printed with an image or colored.

While the invention has been described with particular reference to certain embodiments thereof, it will be understood that changes and modifications may be made which are within the skill of the art. The present invention is limited only by the claims that follow.

What is claimed is:

1. A synthetic laminate structure which comprises:
    (A) an outer layer comprising a substantially transparent copolyester having an inherent viscosity of from about 0.5 to about 1.2 dL/g;
    (B) a printed or colored film layer having opposed surfaces wherein at least one of the surfaces is colored or has an image printed thereon;
    (C) a backing layer disposed adjacent the film layer comprising a polymer selected from the group consisting of polyvinyl chloride and a copolyester; and
    (D) a laminating enhancer layer comprising a polyurethane disposed between the outer layer and the film layer providing a bond between the layers which is characterized by a substantial absence of visible air pockets or adhesion discontinuities.

2. The synthetic laminate structure of claim 1 wherein the copolyester comprises:
    (1) a dicarboxylic acid component comprising repeat units from at least 80 mole % of terephthalic acid or dimethylterephthalate; and
    (2) a diol component comprising repeat units from 98 to 1 mole % ethylene glycol and 2 to 99 mole % cyclohexanedimethanol, based on 100 mole % dicarboxylic acid and 100 mole % diol.

3. The synthetic laminate structure of claim 2 wherein the diol component of the copolyester comprises repeat units from 67 to 75 mole % of ethylene glycol and 33 to 25 mole % of 1,4-cyclohexanedimethanol.

4. The synthetic laminate structure of claim 1 wherein a layer of laminating enhancer is disposed between said outer layer and said printed or colored film layer and between said backing layer and said printed or colored film layer.

5. The synthetic laminate structure of claim 1 wherein the image on the printed or colored film layer is printed with a solvent-based ink.

6. The synthetic laminate structure of claim 1 wherein the printed or colored film layer is prepared from a polymer selected from the group consisting of polyvinyl chloride and a copolyester.

7. The synthetic laminate structure of claim 1 wherein the thickness of the outer layer is from about 0.127 mm to about 12.7 mm thick.

8. The synthetic laminate structure of claim 1 wherein the thickness of the printed or colored film layer is from about 0.025 mm to 0.254 mm thick.

9. The synthetic laminate structure of claim 1 wherein the thickness of the backing layer is from about 0.127 mm to about 24.1 mm thick.

10. The synthetic laminate structure of claim 1 further comprising a hard coat disposed on the outer surface layer.

11. The synthetic laminate structure of claim 10 wherein the hard coat is a bilayer film.

12. The synthetic laminate structure of claim 10 wherein the hard coat is selected from the group consisting of UV-cured or electron-beam-cured crosslinked acrylic, vacuum-cured or UV-cured urethane, UV-cured or electron-beam-cured silicon with acrylic, heat cured urethane or plastisol, and combinations thereof.

13. The synthetic laminate structure of claim 1 wherein the printed or colored film layer has an image of a natural building material.

14. The synthetic laminate structure of claim 13 wherein the natural building material is wood.

15. The synthetic laminate structure of claim 13 wherein the natural building material is stone.

16. A method for making a synthetic laminate structure which comprises:
    I. disposing a laminating enhancer comprising a polyurethane in a random or uniform pattern between a first surface of an outer layer comprising a substantially transparent copolyester having an inherent viscosity of from about 0.5 to about 1.2 dL/g and a first surface of a printed or colored film layer so that a substantially discontinuous layer of the laminating enhancer is sandwiched between the first surface of the outer layer and the first surface of the film layer;
    II. disposing a backing layer comprising a polymer selected from the group consisting of a copolyester and polyvinyl chloride adjacent a second surface of the film layer so that the outer layer and film layer with the laminating enhancer sandwiched therebetween and the backing layer are in superposed relation; and
    III. applying sufficient heat and pressure to the superposed outer layer, film layer and backing layer to cause the laminating enhancer to flow and spread between the outer layer and film layer into a substantially continuous layer providing a bond between the outer layer and film layer characterized by a substantial absence of visible air pockets or adhesion discontinuities.

17. The method of claim 16 wherein the laminating enhancer is disposed by spraying.

18. The method of claim 16 wherein the laminating enhancer is disposed by sputter coating.

19. The method of claim 16 further comprising a laminating enhancer between the backing layer and the second surface of the film layer.

20. The method of claim 16 wherein Step (III) is carried out by hot press bonding followed by cold press bonding wherein hot press bonding is conducted at a temperature of about 250° F. to about 340° F. and a pressure of about 70 psi to about 110 psi and cold press bonding is conducted at a temperature of about 70° F. to about 340° F. and a pressure of about 13 psi to about 500 psi.

21. The method of claim 20 wherein hot press bonding is conducted at a temperature of 270° F. to 295° F. and a pressure of 90 to 100 psi and cold press bonding is conducted at a temperature of 100° F. to 130° F. and a pressure of 100 psi to 300 psi.

* * * * *